United States Patent [19]
Wahlers

[11] Patent Number: 5,908,456
[45] Date of Patent: Jun. 1, 1999

[54] METHOD FOR CONTROLLING A SEAT SUSPENSION SYSTEM

[75] Inventor: Patrick J. Wahlers, Peoria, Ill.

[73] Assignee: Caterpillar Inc., Peoria, Ill.

[21] Appl. No.: 08/912,099

[22] Filed: Aug. 18, 1997

[51] Int. Cl.[6] .............................. G06F 17/00; G06F 7/00
[52] U.S. Cl. .............................. 701/37; 701/38; 701/49; 280/5.5; 280/5.515
[58] Field of Search .................................. 701/37, 38, 46, 701/48, 49; 280/5.5, 5.514, 5.515; 248/317, 562, 550; 267/117, 136

[56] References Cited

U.S. PATENT DOCUMENTS

| | | | |
|---|---|---|---|
| 5,088,760 | 2/1992 | Kakizaki et al. | 280/707 |
| 5,276,622 | 1/1994 | Miller et al. | 364/424.05 |
| 5,358,305 | 10/1994 | Kaneko et al. | 248/566 |
| 5,570,866 | 11/1996 | Stephens | 248/550 |
| 5,582,385 | 12/1996 | Boyle et al. | 248/550 |
| 5,732,370 | 3/1998 | Boyle et al. | 701/37 |

OTHER PUBLICATIONS

Junichi Emura, SAE Tech Paper Series, "Development of the Semi–Active Suspension Sys Based on the Sky–Hook Damper Theory," (SP–1031).

Mark R. Jolly, SAE Technical Paper Series, "The Control of Semi–Active Dampers Using Relative Feedback Signals," Reprinted from SP–802.

*Primary Examiner*—William A. Cuchlinski, Jr.
*Assistant Examiner*—Gertrude Arthur
*Attorney, Agent, or Firm*—W. Bryan McPherson; Pankaj M. Khosla

[57] ABSTRACT

The present invention is adapted to control the motion of a seat 102 located in a seat suspension system 100. The present invention determines a total damping force based on an absolute velocity damping force and a relative velocity damping force. Based on the absolute and relative damping force, a total damping force is determined which will provide a smooth ride for the operator throughout the range of travel of the seat, while prevention collisions with the end stops.

24 Claims, 5 Drawing Sheets

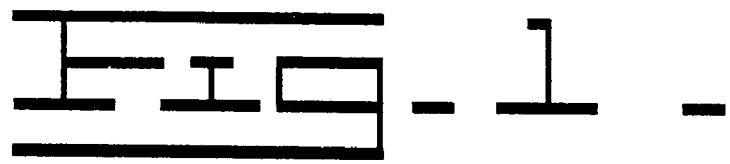
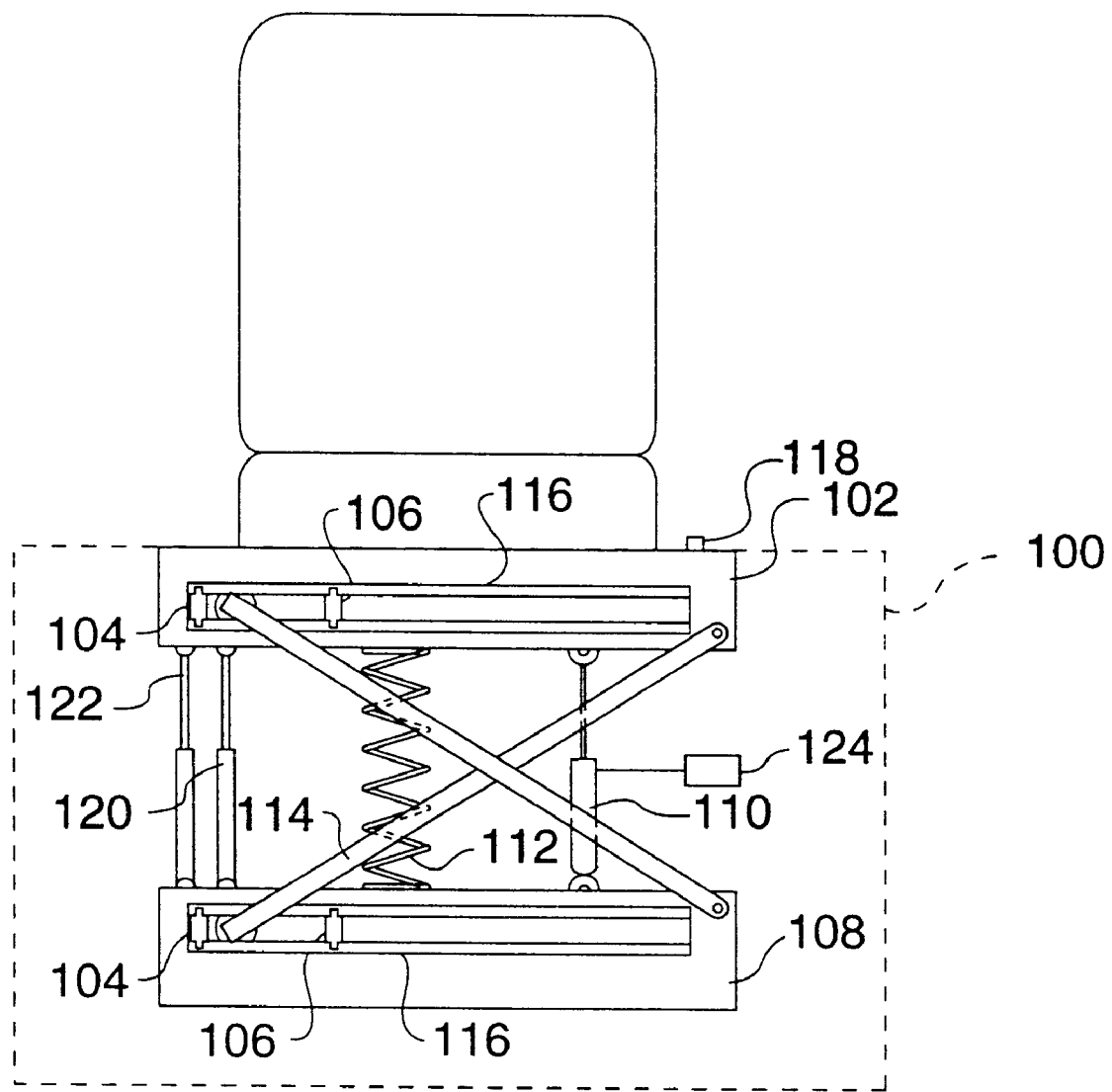

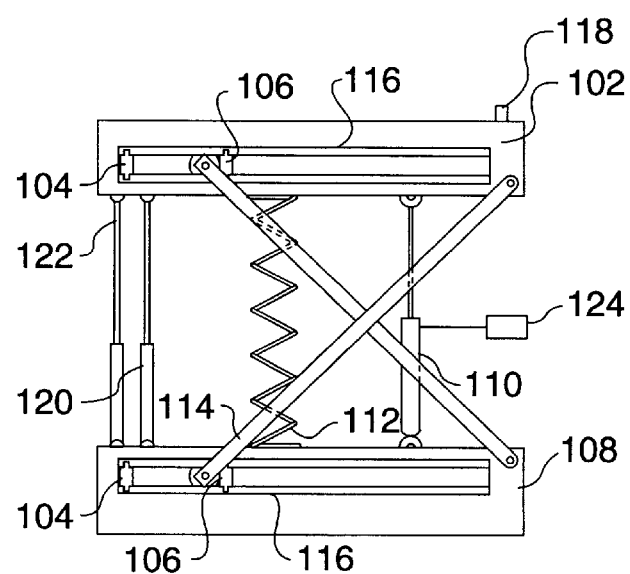
_Fig_2_
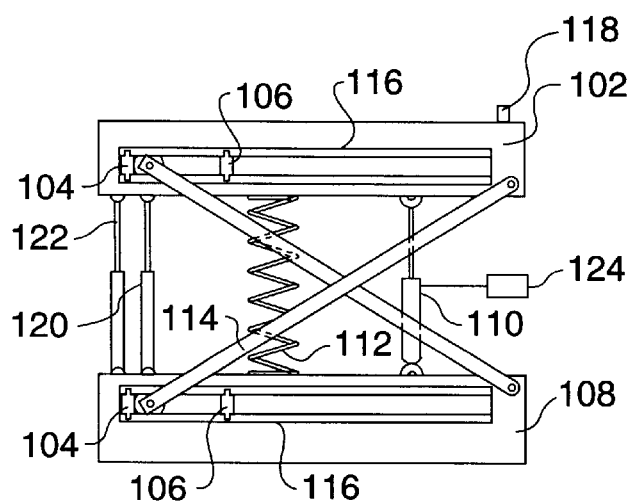
_Fig_3_

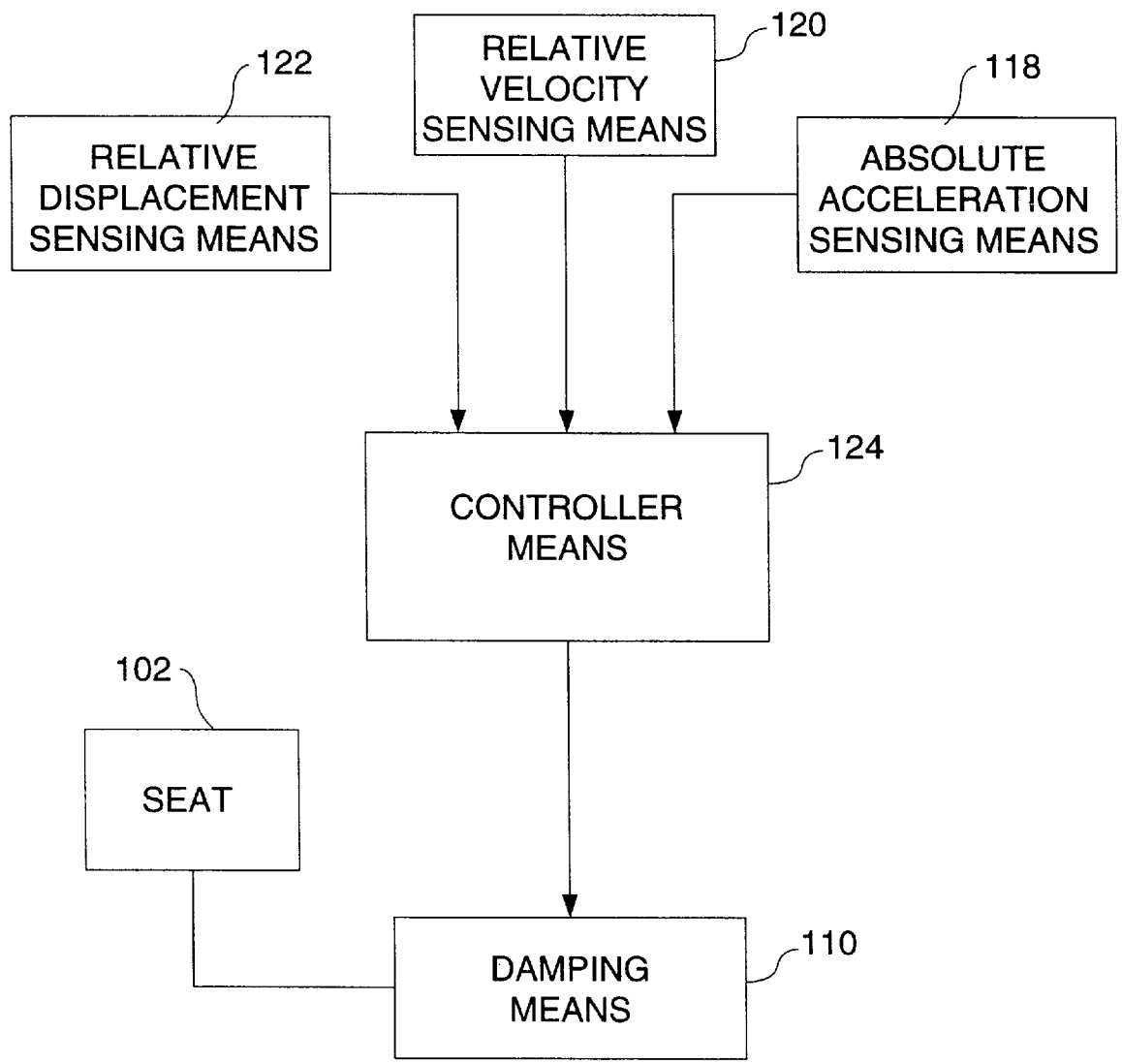

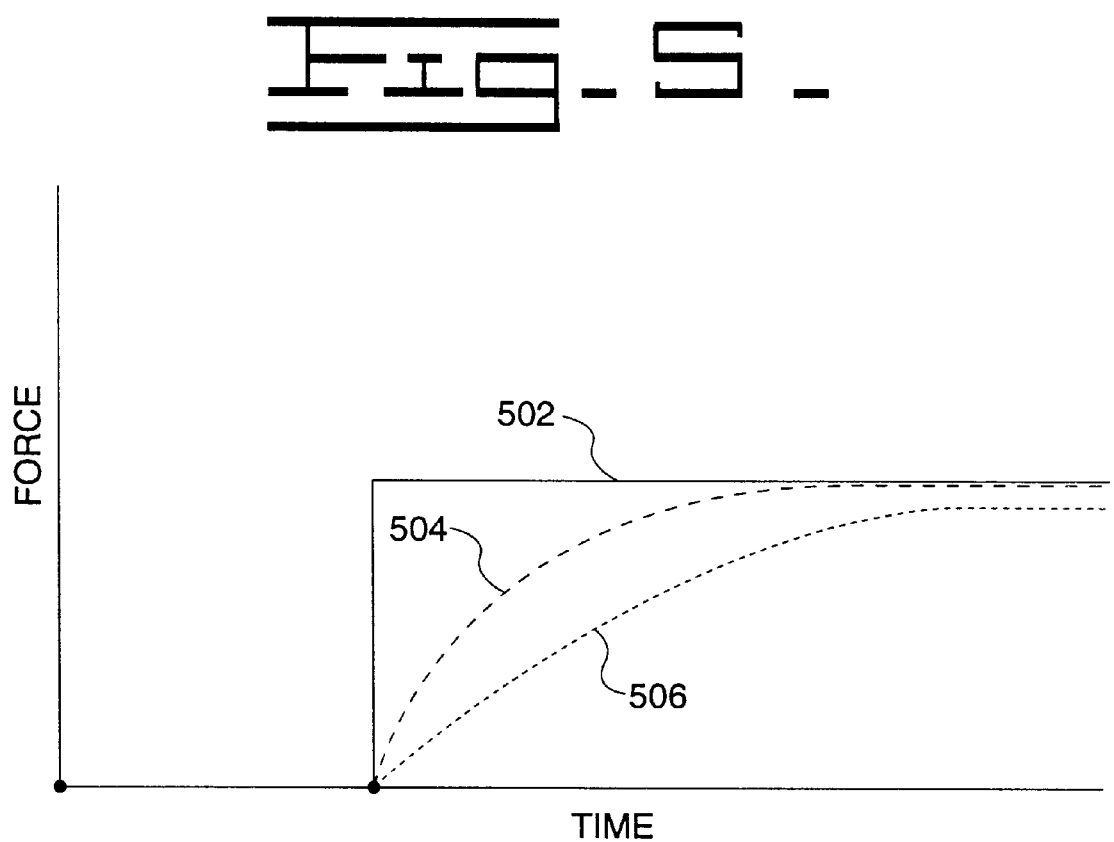

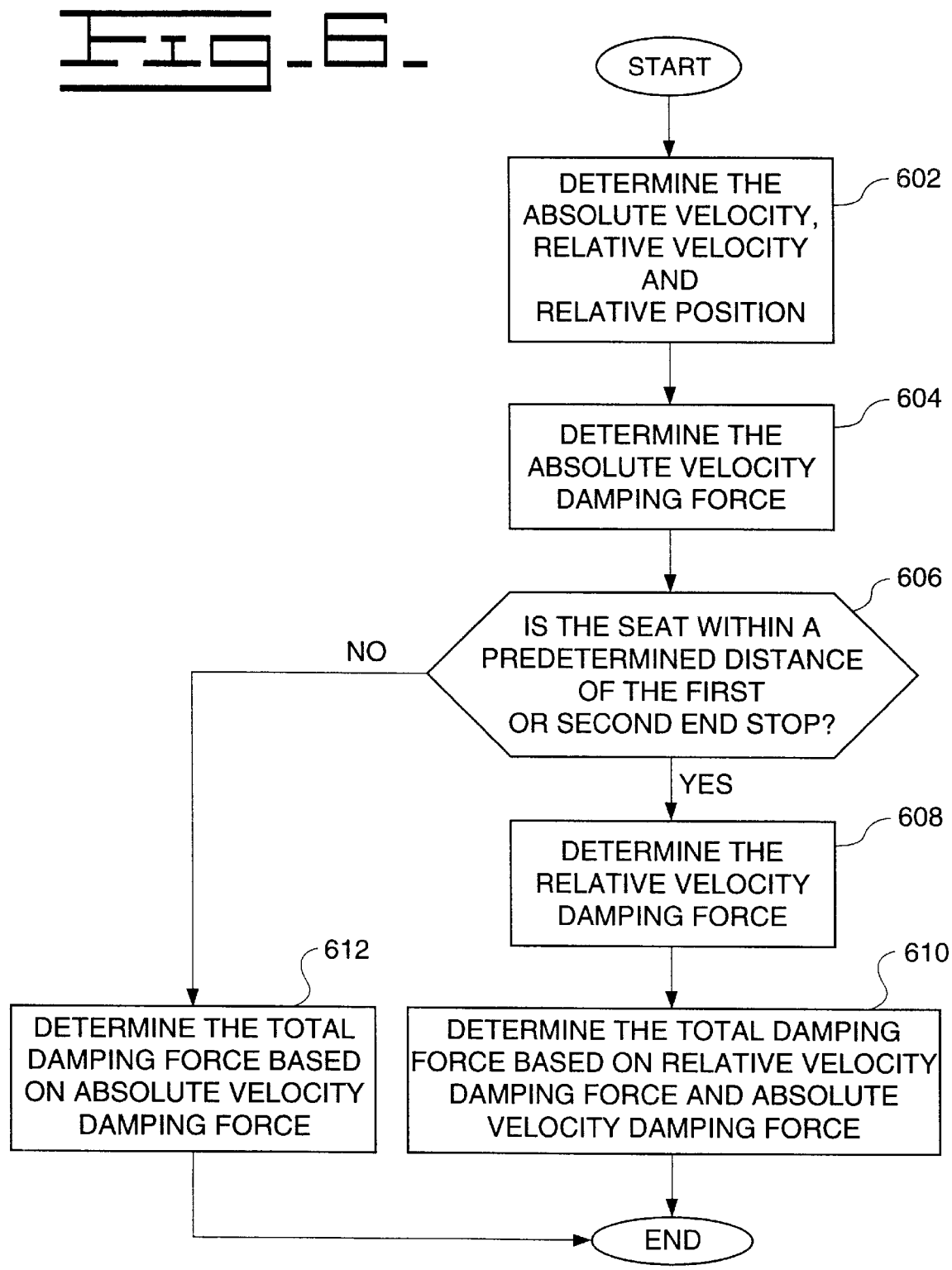

METHOD FOR CONTROLLING A SEAT SUSPENSION SYSTEM

DESCRIPTION

1. Technical Field

This invention relates generally to controlling a seat in a seat suspension system, and more particularly, a method for controlling a seat in a seat suspension system based upon dynamically determining a absolute velocity damping force and a relative velocity damping force.

2. Background Art

Current seat suspension systems experience several shortcomings including the inability to isolate vibration attenuation for most of the seat travel throughout the critical region of human sensitivity, which is approximately 2–6 Hertz, the inability to perform resonance control, and the inability to perform end stop control with gradual transition. While most seat suspension systems are designed to address some of these problems, they do not address all three problems while providing real time control.

Traditional seat suspension systems have been designed to improve operator comfort and vehicle control as the vehicle encounters vibrations introduced by the vehicle itself, and from external input. Traditional seat designs have typically used a spring to support the seat, and a damper to control seat motion at resonance. The limitations of such designs are that there is little transition into the end stops, and the end stops themselves tend to be very abrupt and uncomfortable for the operator. Furthermore, the passive dampers typically used are sensitive to the relative velocity between the seat and base alone. This can severely compromise vibration isolation, especially for complex inputs, where the passive damper may amplify, rather than attenuate vibration.

Since the operator is most sensitive to the absolute velocity of the seat, rather than the relative velocity between seat and base, the most effective damping would be so controlled. While absolute velocity control is very effective at controlling resonance and maintaining higher frequency isolation, it requires large amounts of relative seat travel. Unfortunately, real seats have limited travel, and the operator must remain in contact with the vehicle controls. Therefore, some means of constraint must be provided to limit relative seat travel. Note that it is the movement of the base relative to the seat which is the problem, because the seat is moving much less. The required end stop control is most effectively applied by reacting to the relative seat velocity and the relative seat position, since these two parameters most directly related to end stop constraints.

The present invention is aimed at solving one or more of the problems as set forth above.

DISCLOSURE OF THE INVENTION

In one aspect of the present invention, a method for controlling the motion of a seat located in a seat suspension system is provided. The seat suspension system has a base and a first and second end stop. The method includes the steps of determining an absolute velocity of the seat relative to the ground, determining a relative velocity of the seat relative to the base, and determining a relative seat position of the seat relative to the base. An absolute velocity damping force is determined in response to the absolute seat velocity. A relative velocity damping force is determined in response to the relative seat velocity and the relative seat position when the relative seat position is within a predetermined distance either of the first and second end stops. The total damping force is determined in response to the absolute velocity damping force and the relative velocity damping force when the seat is within a predetermined distance of the end stops. The total damping force is determined in response to the absolute velocity damping force when the seat is not within a predetermined distance of the end stops.

In another embodiment of the present invention, a method for controlling the motion of a seat located in a seat suspension system is provided. The seat suspension system has a base and a first and second end stop. The method includes the steps of determining an absolute velocity of the seat relative to the ground, determining a relative velocity of the seat relative to the base, and determining a relative seat position of the seat relative to the base. An absolute velocity damping force is determined in response to the absolute seat velocity. A relative velocity damping force is determined in response to the relative seat velocity and the relative seat position when the relative seat position is within a predetermined distance either of the first and second end stops. The total damping force is determined in response to the absolute velocity damping force and the relative velocity damping force.

In yet another embodiment of the present invention, a method for controlling the motion of a seat located in a seat suspension system is provided. The seat suspension system has a base and a first and second end stop. The method includes the steps of determining an absolute velocity of the seat relative to the ground, determining a relative velocity of the seat relative to the base, determining a relative seat position of the seat relative to the base, determining a previous and a future total damping force. An absolute velocity damping force is determined in response to the absolute seat velocity, and the previous and future total damping forces. A relative velocity damping force is determined in response to the relative seat velocity, the previous and future total damping forces, and the relative seat position when the relative seat position is within a predetermined distance either of the first and second end stops. The total damping force is determined in response to the absolute velocity damping force and said relative velocity damping force when the seat is within a predetermined distance of the end stops. The total damping force is determined in response to the absolute velocity damping force when the seat is not within a predetermined distance of the end stops.

BRIEF DESCRIPTION OF THE DRAWINGS

FIG. 1 is a diagrammatic illustration of a seat suspension system;

FIG. 2 is a diagrammatic illustration of a seat suspension system in an extended position;

FIG. 3 is a diagrammatic illustration of a seat suspension system in a retracted position;

FIG. 4 is a diagrammatic illustration of a the controlling means and corresponding inputs and outputs;

FIG. 5 is a chart illustrating the command response times of dampers; and

FIG. 6 is a flow diagram illustrating one embodiment of the present invention.

BEST MODE FOR CARRYING OUT THE INVENTION

With reference to FIG. 1, the present invention provides a method for controlling the motion of a seat 102 located in a seat suspension system 100. In the preferred embodiment the seat suspension system is located on an earthmoving machine (not shown). The seat suspension system 100 includes a first end stop 104, a second end stop 106, a base 108, a damping means 110, a spring 112, a travel guide 114, and a travel rail 116. The first and second end stops 104, 106 are located along the travel guide 114 at positions which define the maximum separation distance that may exist between the seat 102 and the base 104, as shown in FIG. 2, and the minimum separation distance that may exist between the seat 102 and the base 104, as shown in FIG. 3. The maximum travel distance of the seat 102 is defined to be the total distance the seat can travel from the first end stop 104 to the second end stop 106.

With reference to FIG. 4, the present invention includes an absolute acceleration sensing means 118, a relative velocity sensing means 120, a relative position sensing means 122, and a controller means 124. The absolute acceleration sensing means 118 is used to sense the absolute acceleration of the seat 102 relative to the ground and responsively generate an absolute acceleration signal. In the preferred embodiment the absolute acceleration sensing means 118 is an accelerometer, and is located on the seat as shown in FIG. 1. The acceleration signal is received by the controlling means 408 and transformed into data indicative of the absolute velocity of the seat relative to the ground.

The relative velocity sensing means 120 is used to sense the relative velocity between the seat 102 and the base 108. In the preferred embodiment the relative velocity sensing means 120 is a linear velocity transducer. Other examples of relative velocity sensing means include a rotary velocity transducer. Alternatively, the relative velocity may be determined by differentiating the relative displacement signal produced by the relative displacement means 122. In the preferred embodiment, the linear velocity transducer is connected between the seat and base, as shown in FIG. 1.

The relative position sensing means 122 is used to sense the relative position, or displacement, between the seat 102 and the base 108. In the preferred embodiment the relative position sensing means 122 is a linear variable differential transformer. Another example of a relative velocity sensing means include rotary displacement sensor. In the preferred embodiment, the linear variable differential transformer is mounted between the seat and base, or through any suitable linkage which moves proportional to the relative velocity and displacement between seat and base, as shown in FIG. 1.

The controller means 124 receives the absolute acceleration, relative velocity, and relative position signals, and responsively determines a total damping force, and generates a total damping force signal. The total damping force is the force which is to be applied to the seat 102 by the damping means 110 to prevent the seat 102 from encountering the first or second end stops 104, 106, while providing the smoothest ride possible for the operator. A damping force that is too low will permit the seat 102 to hit the first or second end stops 104, 106 when a large bump in the machine path is encountered. Instantaneously stopping the motion of the seat 102 can be extremely uncomfortable for the operator. On the other hand, setting the damping force to be too large, too soon, will create a stiff ride for the operator, where the operator feels every bump in the path of the machine because the seat suspension system 100 does not absorb any of the force created by the machine encountering the bump. Therefore the damping force should be dynamically determined such that a large bump will not cause the seat to encounter the first and second end stops 104, 106, and the force created by encountering a small bump may be dissipated by the suspension system 100 without discomfort to the operator. In order to achieve this, the total damping force is broken down into two components, an absolute velocity damping force and a relative velocity damping force. The absolute velocity damping force is a force that accounts for the motion of the machine due to the bump in the path. That is, ideally the operator would not move, and the seat suspension system 100 would absorb all of the force from the bump. The absolute velocity damping force is based on the absolute velocity of the seat 102 relative to the ground. Based on the absolute velocity and the position of the seat 102 relative to the base 108 the absolute velocity damping force accounts for the force needed to be dissipated from the seat suspension system 100 to keep the operator from moving. However, there is a finite amount of movement that the seat suspension system 100 has available to dissipate the force of the bump. That is, with unlimited distance between the end stops 104, 106, the base 108 could rise and fall as much as needed without moving the operator. However, given that any seat suspension system has a finite amount of distance between the end stops 104, 106, a sufficiently large bump will cause the seat 102 to encounter the end stops 104, 106. Therefore, as the seat begins to near the first or second end stop 104, 106, (specifically, the travel guide 114 will approach the first or second end stop 104, 106), an additional damping force needs to be calculated and applied to account for the potential encounter with the first and second end stops 104, 106. Therefore a relative velocity damping force is calculated based on the velocity of the seat 102 relative to the base 108 (relative velocity), and the position of the seat 102 relative to the base 108 (relative displacement). In the preferred embodiment, the relative velocity damping force is not calculated until the seat comes within a predetermined distance of either the first or second end stop 104, 106. In the preferred embodiment, the predetermined distance is 0–25% of the total displacement between the first and second end stops 104, 106. The actual distance within which the relative velocity damping force needs to be applied is based in part on the type of the damper used. For example, a damper with a responsive input command to output force curve would require less distance to appropriately prevent the seat 102 from colliding with one of the end stops 104, 106 than a damper with a less responsive command response time, as shown in FIG. 5. In FIG. 5, a first curve 602 illustrates an ideal curve from a time of command to force applied stand point. A second curve 604 illustrates the command response time for a less responsive damper. A third curve 606 illustrates the command response time for a damper less responsive than that of the second curve 604.

Once the absolute velocity damping force and the relative velocity damping force, if needed, are determined, the total damping force is determined. The total damping force is determined based on the absolute velocity damping force and the relative velocity damping force when the seat is within a predetermined distance of either of the end stops 104, 106. If the seat is not within the predetermined distance of either of the end stops 104, 106, then the total damping force is based on the absolute velocity damping force.

As will be described in more detail below, the present invention utilizes predetermined lookup tables which incorporate knowledge of previous damping forces and projected damping forces to determine the current absolute and relative velocity damping forces. The resulting damping force is a force that has continuity over time. Incorporating previous and projected forces to determine the current damping force has several advantages over other real-time, multiparameter, instantaneous control methods. These advantages include the fact that a force that is continuous over time simplifies control and therefore enhances control stability of the seat suspension system 100. The object of the present invention is two fold, to control the motion of a seat 102 such that the seat 102 does not encounter either of the end stops 104,106, while at the same time providing a smooth ride for the operator. The real time use of an equation to determine the necessary damping force based on instantaneous data may result in a damping force that is independent of the previous damping force applied, or the future damping force that will need to be applied. This solution is in essence a snap shot of the system 100 at a specific point in time, independent of the system conditions one time increment earlier, or one time increment later. A damping force generated in this manner, with no past history or future force projections may create a discontinuity in the force applied over time to the seat suspension system 100. The discontinuity in applied damping force will cause a harsh and unpredictable ride for the operator. By generating a force with regard to at least one previous damping force and at least one projected damping force, the continuity of the force over time can be enhanced. Applying a force having continuity over time will enable the system 100 to provide a smooth ride to the operator, both during the normal travel range of the seat 102, and when the seat 102 begins to approach either of the end stops 104, 106. For example, instead of potentially going from no applied force to a large applied force which will be harsh for the operator, the use of a time continuous force enables the large force to be transitioned into, in order to provide a smoother ride for the operator, while still ensuring the appropriate force will be applied over time to prevent collisions with either of the end stops 104, 106.

In the preferred embodiment the lookup table is created by defining the extreme regions of the system 100. That is by defining the maximum travel of the seat suspension system 100, the normal travel range of the system 100, the maximum acceleration that the operator should experience at any given time, and the maximum force that the operator should experience at any given time. The normal travel range of the seat 100 is the range between the predetermined distance of either end stop 104, 106. The damping force for the normal range of travel of the seat 102 is determined based on the absolute velocity damping force, the previous absolute velocity damping force, and the projected absolute velocity damping force needed to help prevent the collision of the seat 102 with either of the end stops 104, 106 while providing a smooth ride. As the seat 102 approaches either of the end stops 104, 106 the relative velocity damping force is also determined and combined with the absolute damping force to determine the total damping force to apply.

The relative damping force is determined by first establishing a distance from either end stop 104, 106, within which the relative velocity damping needs to be incorporated to avoid colliding with either of the end stops 104, 106. Based on this distance, the maximum force and acceleration the operator should experience, the distance from the end stop which the seat 102 is approaching, the previous relative velocity damping force applied to the system 100, and a projected relative velocity damping force needed to be applied to prevent collision with either of the end stops 104, 106, a relative velocity damping force is determined. The determination of an absolute and relative velocity damping force is repeated for the reasonable number of the possible combinations of input variables into the system until a lookup table is completed for both the absolute and relative velocity damping force. The resulting tables are reviewed to ensure the continuity of force over time. This review is done by analyzing at least one previous force, the current force, and at least one projected force to ensure that the current force does not exceed the predetermined limits for maximum applied force, and maximum incrementally applied force from one time increment to the next. In alternative embodiments of the present invention other parameters may additionally be used to ensure a time continuous force, such as checking the current force with the root mean square acceleration, or the jerk of the system, where jerk is the fourth derivative of displacement. The resulting lookup tables are used to provide a smooth ride to the operator without encountering either of the end stops 104, 106.

Furthermore, switching transients can be reduced using the simple lookup table. Switching transients occur, in part, because of unnecessary over control of the seat suspension system 100. For example it is more important to determine a force that is continuous over time than it is to determine a the ideal instantaneous force to be applied. The later results in effectively turning the damper on and off based on an instantaneous environmental conditions. On-state versus off-state and other switching transients have been shown to contribute to perceived ride harshness and potentially cause control instability. Real-time instantaneous damping force changes cannot currently be accomplished due to limitations with current dampers. For example, as illustrated in FIG. 5, dampers do not respond instantaneously to changes in input. Therefore, the use of lookup tables containing pre-calculated values of the absolute and relative velocity damping force which account for previous damping forces and projected damping forces is the preferred method of determining the appropriate damping force to apply at a given time.

Alternative embodiments of the present invention include determining an absolute velocity damping force and a relative velocity damping force as described above. Then a total damping force that is applied to the seat suspension system 102 is determined based on the absolute and relative velocity damping force, a previous total damping force, and a projected total damping force needed to prevent a collision of the seat 102 and either of the end stops 104, 106.

Alternatively, the real time use of an equation to determine the necessary damping force based on instantaneous data can be incorporated with the present invention, instead of using lookup tables. In the first step, the equation would compute a current, instantaneous damping force to be applied. Then, a final damping force can be determined by taking a previous damping force, the current damping force, and a projected damping force, and modifying the current damping force as needed to provide continuity between the previous and projected damping forces.

In addition, the previous and projected damping forces may be determined by trending data from the several previous damping increments over time, and projecting the damping force over several future time increments. In essence, using previous and projected trending data to determine the current damping force to be applied to the system.

The damping means 110 receives the total damping force signal and responsively applies a resistive damping force to the seat 102. Types of suitable dampers include: magnetorheolical (MR), electrorheological (ER), electronically adjustable orifice types, or any damper which can be controlled by electrical, hydraulic, mechanical, or pneumatic means.

With reference to FIG. 6, a flow diagram illustrating one embodiment of the present invention for controlling a seat 102 in a seat suspension system 100, is shown. In a first control block 602 the absolute velocity, relative velocity, and relative position are determined. In a second control block 604 the absolute velocity damping force is determined based on the absolute velocity and the relative position measurements. In the preferred embodiment the absolute velocity damping force is determined by using a lookup table. The absolute velocity and the relative seat position are used to index into the table to the appropriate value for the absolute velocity damping force. Interpolation may be used to determine the actual value in the event that the measured and calculated values fall between the discrete values stored in the lookup table. The table values are based upon simulation and analysis of empirical data.

There are several methods that can be used to initially determine the absolute velocity damping force values used in the lookup table. In the preferred embodiment, the absolute velocity damping force (Fav) is based on a constant damping coefficient (C), and the absolute seat velocity (Va), (i.e. Fav=C * Va), where C is a function of the relative displacement. For example, a force three times the force of gravity (or 3 Gs) may be the maximum force that the operator should experience, even if the first or second end stops 104, 106, are encountered. Based on the maximum force, the maximum acceleration, and the mass of the system 100, the force the damping means 110 will apply can be determined. The maximum allowable force is set so that for the maximum anticipated input acceleration (based on the projected severity of the environment that the machine is operating in), the applied force does not cause the operator to experience a seat acceleration in excess of 3 G's, for example. The value of 3 G's is the preferred limit for this embodiment of the invention. However the limit is based on how much acceleration the operator should experience, and therefore variations of the limit will still enable the invention to successfully perform the overall function of preventing collisions with either of the end stops 104, 106, while providing a smooth ride. The mass of the system may be determined in several ways. In the preferred embodiment, a predicted average mass of the system is used when the tables are generated. In an alternative embodiment, the mass of the system is predicted and the lookup tables are generated based on the predicted mass of the seat 102. The mass of the seat 102 is then dynamically determined when the machine begins operation, by measuring the relative seat displacement while the machine is in a stable state, and determining the spring pressure of the spring. The measured relative seat displacement is compared with a predicted seat displacement that was used to generate the lookup tables. The measured and predicted seat displacements are compared to generate a scaling factor. The scaling factor is used to scale the values of the lookup tables when a particular value is chosen. Therefore, for example, the control of the seat suspension system 100 accounts for different mass's of the seat 102, which include different weights of the operators.

Another restraint may be imposed on the controlling means 402 when the seat 102 is traveling away from the base 108 to control acceleration so that the operator is not launched from the seat 102 such that the maximum allowable upward force does not exceed the force of gravity which amounts to 9.8 meters/sec$^2$. Given the constraints of maximum available force (damper limited) and maximum allowable force (human limited), the "normal" travel range can be established, and hence where the total damping force must begin to increase in order to help avoid hitting the end stops without a shock to the operator. In the preferred embodiment, an additional damping force, i.e. the relative velocity damping force, is needed when the seat 102 is within 25% of the total travel distance of either the first or second end stop 104, 106.

The purpose for making the constant damping coefficient, C, a function of the relative displacement is to improve the transition between absolute and relative velocity control in the event that the seat 102 comes within the predetermined distance of either of the end stops 104, 106, i.e. to improve the smoothness of the applied damping force. In an alternative embodiment, the absolute velocity damping force is set based on the absolute velocity alone. The damping force in this case is C * Va, where C is a constant damping coefficient.

In either of the alternative embodiment of the damping coefficient C, C is a based on the critical damping force. The critical damping force Cc can be calculated as follows: $Cc=2 * \sqrt{k*m}$, where k is the air spring rate, and m is the total suspended mass. In the preferred embodiment, C is a function of displacement, C will be much higher than the critical damping factor, i.e., 4 times or more when approaching either of the end stops 104, 106.

While the use of lookup tables to determine the appropriate damping force is the preferred method, other methods may be used such as dynamic calculations using explicit formulas. However, the dynamically calculated formulas must have the ability to account for trending previous and projected forces in order to produce a resulting damping force that is continuous over time.

With reference to FIG. 6 again, in a first decision block 606 a determination is made regarding whether the seat is located within a predetermined distance of first or second end stops 104, 106. In the preferred embodiment the range of the predetermined distance is within 0 to 25% of the maximum travel distance between the first and second end stops 104, 106. If the seat 102 is within the predetermined distance of the first or second end stops 104, 106, then control passes to a third control block 608 to determine the relative velocity damping force. In the preferred embodiment the relative velocity damping force is determined by using a lookup table. The relative velocity and the relative seat position are used to index into the table to the appropriate value for the relative velocity damping force. The relative velocity damping force is proportional to the relative velocity and inversely proportional to the distance from the end stop that the seat 102 is approaching. The table values are based upon simulation and analysis of empirical data. Alternative embodiments using explicit formulas instead of the predetermined lookup tables may be employed. In the preferred embodiment, the absolute and relative velocity damping forces are set such that maximum acceleration limits of the seat 102 are not exceeded, which in this case is approximately 30 meters/sec$^2$ when the seat 102 is near one of the end stops and C is a function of displacement. The maximum allowable force then, Fmax=m*A, where m is the suspended mass (seat plus the operator).

If the seat 102 is determined to be within a predetermined distance of either of the end stops 104, 106, control then passes to a fourth control block 510 to determine the total damping force based on the absolute velocity damping force and the relative velocity damping force. In the preferred embodiment, the absolute velocity damping force is added to the relative velocity damping force to obtain the total damping force.

Referring back to the first decision block 606, if the seat is not within the predetermined distance of its maximum or minimum travel distance, then control passes to a fifth control block 512 and the total damping force is determined based on the absolute velocity damping force. In the preferred embodiment the total damping force is set equal to the absolute velocity damping force. Since the seat is not within the predetermined distance of either the first or second end stops 104, 106, then the relative velocity damping force is not a necessary factor in determining the total damping force to apply to the seat.

Control is then passed to the end of the method 600, and then cycles to the beginning of the method 600 to calculate the total damping force again.

When the total damping force is determined, a total damping force signal is sent to the damping means, and the damping means applies a resistive force to the seat 102 to reduce the motion of the seat 102.

In an alternative embodiment of the present invention, the relative velocity damping force may determined throughout the range of motion of the seat 102. This approach will enable the system to account for the relative velocity damping force regardless of the current position of the seat 102.

In another embodiment of the present invention, adaptive feedback control is incorporated into the determination of the total damping force. Adaptive feedback control provides the additional advantage that as the characteristics of the machine change over the course of operation, the present invention can adapt to the changes while continuing to provide a smooth ride to the operator. For example, characteristics such as tire inflation, specific characteristics of the suspension system, age of the vehicle, weight of the operator, the wear of the damper, etc., can change from one day to the next. In addition, not all dampers of the same type exhibit exactly the same characteristics. Using adaptive feedback control, the present invention may account for the changes while maintaining a smooth ride for the operator. These changes can be accounted for by monitoring the expected and actual results of applying the determined total damping force to the seat suspension system 100. Differences in the expected and actual results, for example the expected relative seat displacement after a damping force is applied versus the actual relative seat displacement, are used to determine a scaling factor. The scaling factor is then multiplied with the current total damping force determined by using the lookup tables. The resulting modified total damping force is then applied to the seat suspension system 100. By incorporating the difference between the expected and actual results, the seat suspension system 100 is able to adapt to changing machine conditions without having to recalculate a lookup table, or create a new equation capable of determining a force that is continuous over time and that accounts for the changing conditions. In the preferred embodiment the present invention will analyze several time increments of data before altering the scaling factor. This is to ensure that the system in not overreacting to an instantaneous, non repetitive event.

In the preferred embodiment, the controller means 124 is a microprocessor based system (not shown) that includes random access memory (not shown) and read only memory (not shown). The lookup tables and associated determinations are implemented in software and executed on the microprocessor based system.

INDUSTRIAL APPLICABILITY

With reference to the drawings and in operation, the present invention is adapted to control the motion of a seat 102 located in a seat suspension system 100.

During a normal range of motion the seat 102 will not encounter the end stops 104, 106 of the seat suspension system 100. During this range of motion, a damping force including an absolute velocity damping force is used to control a damping means 110. The absolute velocity damping force is determined based on the absolute velocity of the seat 102, the relative displacement between the seat 102 and the base 108, and at least one previous value for the total damping force and at least one future value for the total damping force.

When the normal range of motion is exceeded, i.e., the seat 102 is within a predetermined distance of one of the end stops 104, 106, the force used to control the damping means 110 is comprised of an absolute velocity damping force, and a relative velocity damping force. The claimed invention enables a seat suspension system 100 to provide a smooth ride to an operator while avoiding collisions between the end stops 104, 106 and the seat 102.

The ability to incorporate an absolute velocity damping force and a relative velocity damping force when needed, based in part in at least one previous value of the total damping force and at least one future values for the total damping force, provides a smooth ride for the operator of an earth moving machine while over rough ground terrain.

Incorporating adaptive feedback control will enable the seat suspension system 100 to provide a smooth ride from one day to the next regardless of the environmental changes such as a different operator, changes in the machine etc.

Other aspects, objects, advantages and uses of the present invention can be obtained from a study of the drawings, disclosure and appended claims.

I claim:

1. A method for controlling the motion of a seat located in a seat suspension system having a base, and a first and second end stop, comprising the steps of:

determining an absolute velocity of the seat relative to the ground;

determining a relative velocity of the seat relative to the base;

determining a relative seat position of the seat relative to the base;

determining an absolute velocity damping force in response to said absolute seat velocity;

determining a relative velocity damping force in response to said relative seat velocity and said relative seat position; and determining a total damping force in response to said absolute velocity damping force and said relative velocity damping force.

2. A method as set forth in claim 1, wherein the step of determining an absolute velocity damping force includes the step of determining said absolute damping force in response to said absolute seat velocity and said relative seat position.

3. A method for controlling the motion of a seat located in a seat suspension system having a base, and a first and second end stop, comprising the steps of:

determining an absolute velocity of the seat relative to the ground;

determining a relative velocity of the seat relative to the base;

determining a relative seat position of the seat relative to the base;

determining an absolute velocity damping force in response to said absolute seat velocity;

determining a relative velocity damping force in response to said relative seat velocity and said relative seat position, said determination being made when said relative seat position is within a predetermined distance of one of said first and second end stops, said predetermined distance being within the range of 0 to 25% of the total distance between said first and second end stops;

determining a total damping force in response to said absolute velocity damping force and said relative velocity damping force when said relative seat position is within said predetermined distance of one of said first and second end stops; and determining a total damping force in response to said absolute velocity damping force when said relative seat position is one of equal to and greater than said predetermined distance of one of said first and second end stops.

4. A method as set forth in claim 3, wherein the step of determining said absolute velocity damping force includes the step of selecting a predetermined absolute velocity damping force from a lookup table in response to said absolute seat velocity and said relative seat position.

5. A method as set forth in claim 4, wherein the step of determining a relative velocity damping force includes the step of selecting a predetermined relative velocity damping force from a lookup table in response to said relative seat velocity and said relative seat position.

6. A method as set forth in claim 3, wherein the step of determining an absolute velocity damping force includes the step of determining said absolute damping force in response to said absolute seat velocity and said relative seat position.

7. A method as set forth in claim 3, further including the steps of:

determining at least one previous total damping force; and determining at least one future total damping force.

8. A method as set forth in claim 7, wherein the step of determining an absolute velocity damping force includes the step of determining said absolute velocity damping force in response to said at least one previous total damping force and said at least one future total damping force.

9. A method as set forth in claim 8, wherein the step of determining a relative velocity damping force includes the step of determining said relative velocity damping force in response to said at least one previous total damping force and said at least one future total damping force.

10. A method as set forth in claim 3, wherein said predetermined distance is within the range of 0 to 20% of the total distance between said first and second end stops.

11. A method as set forth in claim 3, wherein said predetermined distance is within the range of 0 to 15% of the total distance between said first and second end stops.

12. A method as set forth in claim 3, wherein said predetermined distance is within the range of 0 to 5% of the total distance between said first and second end stops.

13. A method for controlling the motion of a seat located in a seat suspension system having a base, and a first and second end stop, comprising the steps of:

determining an absolute velocity of the seat relative to the ground;

determining a relative velocity of the seat relative to the base;

determining a relative seat position of the seat relative to the base;

determining at least one previous total damping force;

determining at least one future total damping force;

determining an absolute velocity damping force in response to said absolute seat velocity, said at least one previous total damping force, and said at least one future total damping force;

determining a relative velocity damping force in response to said relative seat velocity, said relative seat position, said at least one previous total damping force, and said at least one future total damping force, said determination being made when said relative seat position is within a predetermined distance of one of said first and second end stops, said predetermined distance being within the range of 0 to 25% of the total distance between said first and second end stops;

determining a total damping force in response to said absolute velocity damping force and said relative velocity damping force when said relative seat position is within said predetermined distance of one of said first and second end stops; and determining a total damping force in response to said absolute velocity damping force when said relative seat position is one of equal to and greater than said predetermined distance of one of said first and second end stops.

14. A method as set forth in claim 13, wherein the step of determining said total damping force in response to said absolute velocity damping force includes the step of determining said total damping force in response to said absolute velocity damping force, said at least one previous total damping force, and said at least one future total damping force.

15. A method as set forth in claim 14, wherein the step of determining said total damping force in response to said absolute velocity damping force and said relative velocity damping force includes the step of determining said total damping force in response to said absolute velocity damping force, said relative velocity damping force, said at least one previous total damping force, and said at least one future total damping force.

16. A method for controlling the motion of a seat located in a seat suspension system having a base, and a first and second end stop, comprising the steps of:

determining an absolute velocity of the seat relative to the ground;

determining a relative velocity of the seat relative to the base;

determining a relative seat position of the seat relative to the base;

determining an absolute velocity damping force in response to said absolute seat velocity;

determining a scaling factor based on at least one of a previous relative seat position and a previous relative velocity;

determining a relative velocity damping force in response to said relative seat velocity and said relative seat position, said determination being made when said relative seat position is within a predetermined distance of one of said first and second end stops;

determining a total damping force in response to said absolute velocity damping force, said relative velocity damping force, and said scaling factor when said relative seat position is within said predetermined distance of one of said first and second end stops; and determining a total damping force in response to said absolute velocity damping force and said scaling factor when said relative seat position is one of equal to and greater than said predetermined distance of one of said first and second end stops.

17. A method as set forth in claim 16, wherein the step of determining a scaling factor based on at least one of a previous relative seat position and a previous relative velocity includes the step of determining said scaling factor based on at least one previous relative seat position.

18. A method as set forth in claim 17, wherein the step of determining a scaling factor based on at least one of a previous relative seat position and a previous relative velocity includes the step of determining said scaling factor based on at least one previous relative velocity.

19. A method as set forth in claim 16, including the steps of:

determining at least one previous total damping force; and determining at least one future total damping force.

20. A method as set forth in claim 19, wherein the step of determining an absolute velocity damping force includes the step of determining said absolute velocity damping force in response to said at least one previous total damping force and said at least one future total damping force.

21. A method as set forth in claim 20, wherein the step of determining a relative velocity damping force includes the step of determining said relative velocity damping force in response to said at least one previous total damping force and said at least one future total damping force.

22. A method as set forth in claim 19, wherein the step of determining said total damping force in response to said absolute velocity damping force includes the step of determining said total damping force in response to said absolute velocity damping force, said at least one previous total damping force, and said at least one future total damping force.

23. A method as set forth in claim 19, wherein the step of determining said total damping force in response to said absolute velocity damping force and said relative velocity damping force includes the step of determining said total damping force in response to said absolute velocity damping force, said relative velocity damping force, said at least one previous total damping force, and said at least one future total damping force.

24. A method as set forth in claim 16, wherein said predetermined distance is within the range of 0 to 25% of the total distance between said first and second end stops.

* * * * *